(12) United States Patent
Kurahashi et al.

(10) Patent No.: US 8,560,187 B2
(45) Date of Patent: Oct. 15, 2013

(54) CONTROLLER FOR CONTINUOUSLY VARIABLE TRANSMISSION AND CONTROL METHOD THEREOF

(75) Inventors: Yoshihiro Kurahashi, Machida (JP);
Shinichiro Watanabe, Yokohama (JP);
Tomomasa Ikeda, Sagamihara (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 13/371,871

(22) Filed: Feb. 13, 2012

(65) Prior Publication Data
US 2012/0245807 A1   Sep. 27, 2012

(30) Foreign Application Priority Data
Mar. 23, 2011   (JP) .................................. 2011-63899

(51) Int. Cl.
*G06F 7/00*   (2006.01)
(52) U.S. Cl.
USPC .......................................................... 701/51
(58) Field of Classification Search
USPC ............................................. 701/51; 474/11
See application file for complete search history.

(56) References Cited

U.S. PATENT DOCUMENTS 5,800,306 A * 9/1998 Mori ................................ 477/62
6,695,742 B2 * 2/2004 Hagiwara et al. ............... 477/46
6,740,005 B2 * 5/2004 Kato et al. ...................... 477/110
7,140,990 B2 * 11/2006 Sawada et al. .................. 474/18
7,892,141 B2 * 2/2011 Yamaguchi et al. ............ 477/46

FOREIGN PATENT DOCUMENTS

EP        1 933 063 A2    6/2008
JP        2005-344860 A   12/2005

OTHER PUBLICATIONS

Machine Translation of JP 2005-344860, Dec. 15, 2005.*

* cited by examiner

*Primary Examiner* — Mary Cheung
*Assistant Examiner* — Anne Mazzara
(74) *Attorney, Agent, or Firm* — Foley & Lardner LLP

(57) ABSTRACT

A controller controls a continuously variable transmission including a variator with a primary pulley, a secondary pulley, and a power transmission member mounted therebetween. A torque converter is provided with a rotational speed detector detecting the rotational speed of a rotor located closer to drive wheels than the torque converter, a rotational speed change amount calculator calculating a change amount in the rotational speed per unit time, a limit setting unit that sets a higher absolute value of a limiter for the change amount as a rotational speed difference between an input shaft and an output shaft of the torque converter increases, a final change amount setting unit setting the smaller of the absolute value of the change amount and of the limiter as a final change amount, and a hydraulic controller controlling a hydraulic pressure to the variator based on the final change amount.

12 Claims, 6 Drawing Sheets

CONTROLLER FOR CONTINUOUSLY VARIABLE TRANSMISSION AND CONTROL METHOD THEREOF

FIELD OF THE INVENTION

The present invention relates to a controller for a continuously variable transmission and a control method thereof.

BACKGROUND OF THE INVENTION

JP2005-344860A discloses a conventional controller which uses an output correction value calculated from a detection value detected at the time of executing a routine last time and a moving average value before a predetermined time when the rotational speed of a continuously variable transmission is detected by a sensor and a change amount in the detected rotational speed is above an upper-limit threshold value or below a lower-limit threshold value.

SUMMARY OF THE INVENTION

The upper-limit threshold value and the lower-limit threshold value of the above invention are set with a margin so that the output correction value is used in the case of false detection caused by a sensor error or disturbance.

The margin is preferably set such that an output value of the sensor becomes the final rotational speed in a range where detection accuracy of the sensor is high and the output correction value becomes the final rotational speed in a range where the detection accuracy of the sensor is low.

Here, when there is a rotational speed difference between an input rotational speed and an output rotational speed (e.g. converter state) in a torque converter, influences caused by disturbance and the like are absorbed by the torque converter, wherefore the detection accuracy by the sensor increases. On the other hand, when there is no rotational speed difference between the input rotational speed and the output rotational speed (lock-up state), influences caused by disturbance and the like cannot be absorbed by the torque converter, wherefore the detection accuracy by the sensor decreases.

That is, it is preferable that the output value of the sensor becomes the final rotational speed when there is a rotational speed difference in the torque converter and the output correction value becomes the final rotational speed when there is no rotational speed difference.

However, in the above invention, the upper limit value and the like are set without considering the states of the torque converter (converter state, lock-up state and the like). Thus, if the margin is set to be excessively large, the output value of the sensor may be set as the final rotational speed despite low detection accuracy of the sensor due to an influence such as an error or disturbance when the torque converter is in the lock-up state. On the other hand, if the margin is set to be excessively small, the output correction value may be set as the final rotational speed despite high detection accuracy of the sensor when the torque converter is in the converter state. If the rotational speed with low accuracy is set as the final rotational speed and a hydraulic pressure of the transmission is controlled based on the rotational speed with low accuracy in this way, there is a problem that fuel economy is deteriorated by excessive supply of the hydraulic pressure or belt slippage occurs due to insufficient supply of the hydraulic pressure.

The present invention was developed to solve such a problem and aims to improve fuel economy and suppress belt slippage by calculating a final rotational speed in conformity with a state of a torque converter and controlling a hydraulic pressure of a transmission based on a rotational speed with high accuracy.

One aspect of the present invention is directed to a controller for controlling a continuously variable transmission including a variator with a primary pulley at an input side for changing a groove width by a hydraulic pressure, a secondary pulley at an output side for changing a groove width by a hydraulic pressure and a power transmission member mounted between the primary pulley and the secondary pulley, and a torque converter arranged between a drive source and the variator. The controller includes a rotational speed detecting unit that detects the rotational speed of a rotor located closer to drive wheels than the torque converter; a rotational speed change amount calculating unit that calculates a change amount in the rotational speed per unit time; a limit setting unit that sets a higher absolute value of a limiter for the change amount as a rotational speed difference between an input shaft and an output shaft of the torque converter increases; a final change amount setting unit that sets the smaller one of the absolute value of the change amount and that of the limiter as a final change amount; and a hydraulic control unit that controls a hydraulic pressure to be supplied to the variator based on the final change amount.

Another aspect of the present invention is directed to a control method for controlling a continuously variable transmission including a variator with a primary pulley at an input side for changing a groove width by a hydraulic pressure, a secondary pulley at an output side for changing a groove width by a hydraulic pressure and a power transmission member mounted between the primary pulley and the secondary pulley, and a torque converter arranged between a drive source and the variator. The control method includes detecting the rotational speed of a rotor located closer to drive wheels than the torque converter; calculating a change amount in the rotational speed per unit time; setting a higher absolute value of a limiter for the change amount as a rotational speed difference between an input shaft and an output shaft of the torque converter increases; setting the smaller one of the absolute value of the change amount and that of the limiter as a final change amount; and controlling a hydraulic pressure to be supplied to the variator based on the final change amount.

According to these aspects, it is possible to improve fuel economy and suppress belt slippage since the limiter for the change amount is set according to the state of the torque converter and the hydraulic pressure to be supplied to the variator is controlled using the final change amount with high accuracy.

DESCRIPTION OF THE PREFERRED EMBODIMENT

Hereinafter, an embodiment of the present invention is described in detail based on the drawings.

Figure 1:
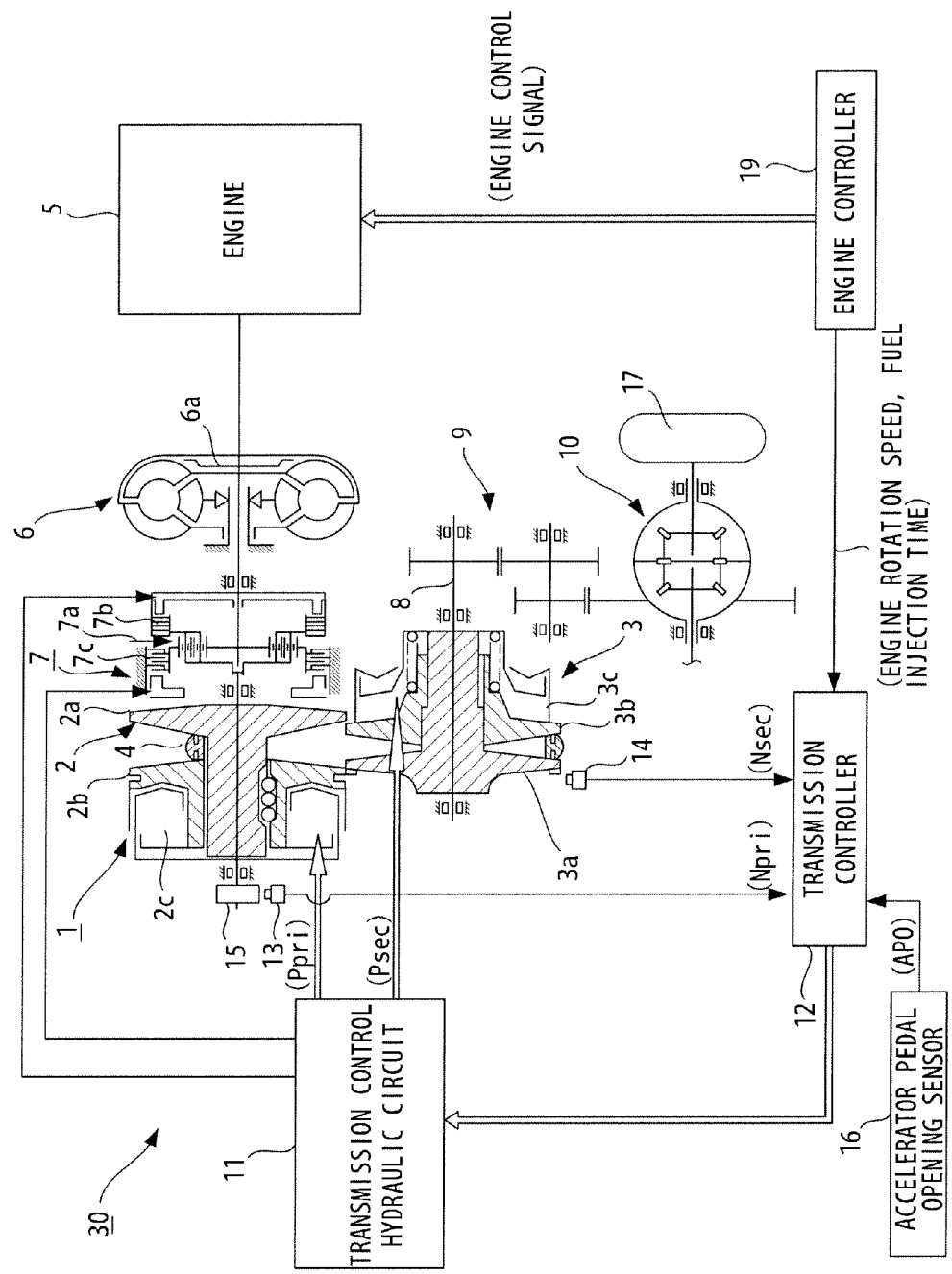
FIG. 1 is a diagram schematically showing a vehicle with a continuously variable transmission according to an embodiment of the present invention.

FIG. 1 schematically shows a vehicle with a continuously variable transmission 30 according to this embodiment. The continuously variable transmission 30 includes a torque converter 6, a forward/reverse switching mechanism 7, a variator 1 and a transmission controller 12.

The variator 1 includes a primary pulley 2 and secondary pulley 3 arranged such that V-grooves of the both pulleys are aligned, and a belt 4 is mounted in the V-grooves of these pulleys 2, 3.

An engine 5 is arranged coaxially with the primary pulley 2, and the torque converter 6 and the forward/reverse switching mechanism 7 are successively disposed from the side of the engine 5 between the engine 5 and the primary pulley 2.

The torque converter 6 includes a lock-up clutch 6a. The torque converter 6 is switched to a lock-up state where the lock-up clutch 6a is completely engaged, a converter state where the lock-up clutch 6a is completely released and a slip state where the lock-up clutch 6a is half-engaged.

The forward/reverse switching mechanism 7 includes a double-pinion planetary gear set 7a as a main constituent element, a sun gear of the double-pinion planetary gear set 7a is coupled to the engine 5 via the torque converter 6 and a carrier thereof is coupled to the primary pulley 2. The forward/reverse switching mechanism 7 further includes a forward clutch 7b for directly coupling the sun gear and the carrier of the double-pinion planetary gear set 7a and a reverse brake 7c for fixing a ring gear. Input rotation transmitted from the engine 5 via the torque converter 6 is transmitted to the primary pulley 2 as it is when the forward clutch 7b is engaged, and input rotation transmitted from the engine 5 via the torque converter 6 is transmitted to the primary pulley 2 while being reversed and decelerated when the reverse brake 7c is engaged.

The rotation of the primary pulley 2 is transmitted to the secondary pulley 3 via the belt 4, and the rotation of the secondary pulley 3 is, thereafter, transmitted to drive wheels 17 via an output shaft 8, a gear set 9 and a differential gear device 10.

To make a rotation transmission ratio (speed ratio) between the primary pulley 2 and the secondary pulley 3 changeable during the above power transmission, ones of conical plates forming the V-grooves of the primary pulley 2 and the secondary pulley 3 are fixed conical plates 2a, 3a and the other conical plates 2b, 3b are movable conical plates displaceable in an axial direction. These movable conical plates 2b, 3b are biased toward the fixed conical plates 2a, 3a by supplying a primary pulley pressure Ppri and a secondary pulley pressure Psec produced using a line pressure as a source pressure to a primary pulley chamber 2c and a secondary pulley chamber 3c, whereby the belt 4 is frictionally engaged with the conical plates to transmit power between the primary pulley 2 and the secondary pulley 3.

In shifting the transmission, a target speed ratio I(o) is realized by changing the widths of the V-grooves of the both pulleys 2, 3 by a pressure difference between the primary pulley pressure Ppri and the secondary pulley pressure Psec produced in correspondence with the target speed ratio I(o) to continuously change a winding arc diameter of the belt 4 on the pulleys 2, 3.

The output of the primary pulley pressure Ppri and the secondary pulley pressure Psec is controlled by a transmission control hydraulic circuit 11 together with the output of engaging hydraulic pressures of the forward clutch 7b engaged when a forward drive range is selected and the reverse brake 7c engaged when a reverse drive range is selected. The transmission control hydraulic circuit 11 is controlled in response to a signal from the transmission controller 12.

To the transmission controller 12 are input a signal from a primary pulley rotation sensor 13 for detecting a primary pulley rotational speed Npri, a signal from a secondary pulley rotation sensor 14 for detecting a secondary pulley rotational speed Nsec, a signal from an accelerator pedal opening sensor 16 for detecting an acceleration pedal opening APO, an engine rotational speed and a fuel injection time from an engine controller 19 for controlling the engine 5, and the like.

The transmission controller 12 is composed of a CPU, a ROM, a RAM and the like, and functions of the continuously variable transmission 30 are fulfilled by reading a program stored in the ROM by the CPU.

Figure 2:
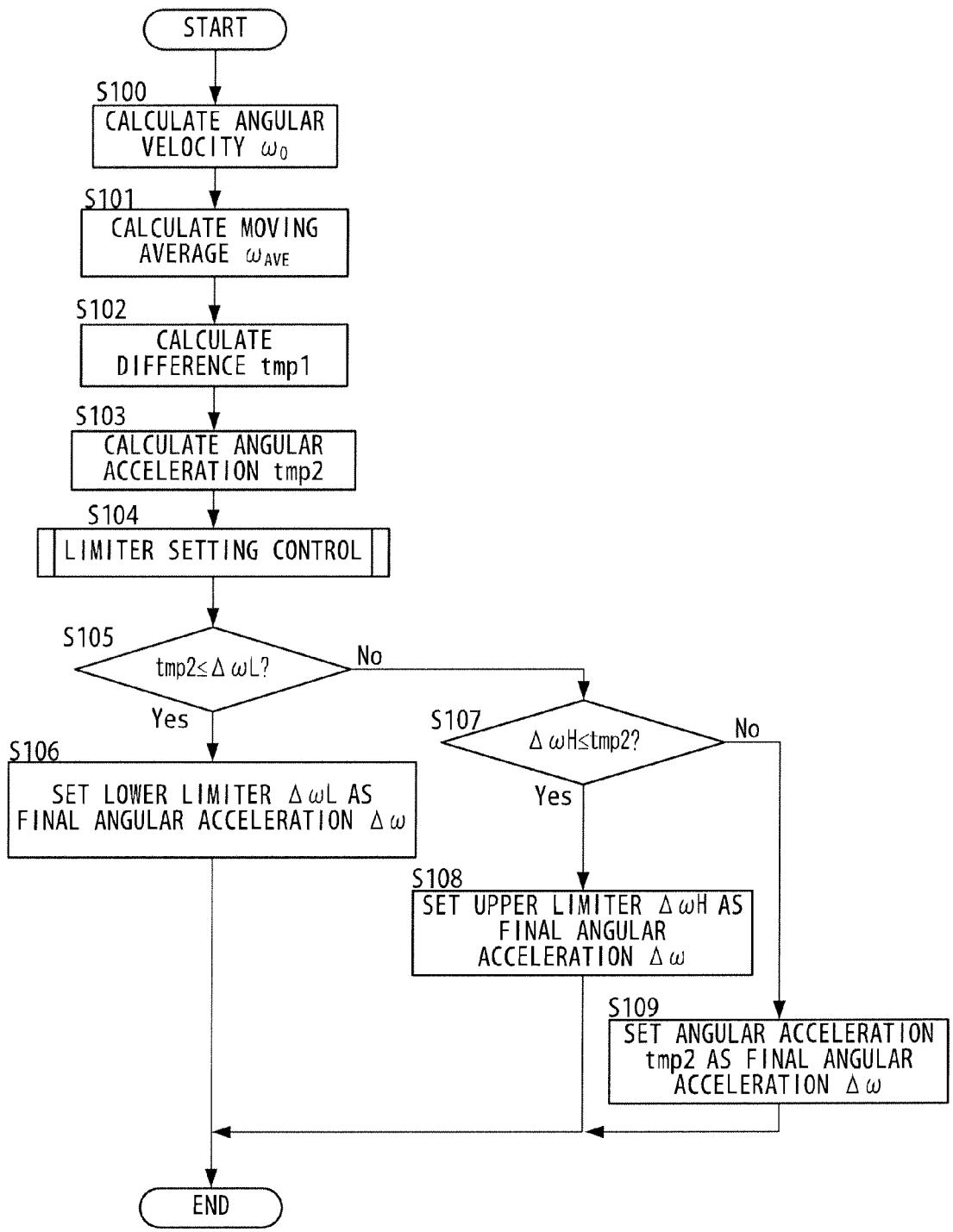
FIG. 2 is a flow chart for calculating a final angular acceleration of this embodiment.

Next, a control of this embodiment for calculating a final angular acceleration is described using a flow chart of FIG. 2. The control described below is executed at every predetermined time interval, e.g. every $1/100$ sec.

In Step S100, the transmission controller 12 calculates an angular velocity $\omega_0$ based on the primary pulley rotational speed Npri calculated by the primary pulley rotation sensor 13. The transmission controller 12 calculates the angular velocity $\omega_0$ by detecting a pulse signal given from a rotor 15 integrally rotating with the primary pulley 2 by the primary pulley rotation sensor 13. In this embodiment, the transmission controller 12 calculates the angular velocity $\omega_0$ by dividing a total time between pulses per unit time by a pulse number per unit time.

In Step S101, the transmission controller 12 calculates a moving average $\omega_{AVE}$ of the angular velocity $\omega_0$ using Equation (1).

$$\omega_{AVE} = \frac{\sum_{k=1}^{n} \omega_{-n}}{n} \quad (1)$$

$\omega_{-n}$ indicates an angular velocity of the primary pulley 2 calculated in the $n^{th}$ previous control before the present one. Here, the moving average $\omega_{AVE}$ is calculated using five angular velocities (n=5) obtained in the controls immediately before the present control. That is, the moving average $\omega_{AVE}$ is a moving average from an angular velocity $\omega_{-5}$ calculated in the fifth previous control from the present one to an angular velocity $\omega_{-1}$ calculated in the last control.

Note that it is also possible to improve detection accuracy using a low-pass filter, but the influence of an abnormal value becomes large and an error becomes large when there is an outstandingly different abnormal value in the case of using the low-pass filter. Further, a response is delayed by a time constant of the filter.

In this embodiment, it is possible to reduce a process load and improve detection accuracy and responsiveness by using the moving average.

The angular velocity $\omega_0$ calculated this time is stored as an angular velocity $\omega_{-1}$ used in the next control, and the angular velocities $\omega_{-1}$ to $\omega_{-5}$ used to calculate the moving average $W_{AVE}$ this time are successively updated as angular velocities $\omega_{-2}$ to $\omega_{-6}$.

In Step S102, the transmission controller 12 calculates a difference tmp1 between the angular velocity $\omega_0$ and the moving average $\omega_{AVE}$ calculated this time by Equation (2).

$$tmp1 = \omega_0 - \omega_{AVE} \tag{2}$$

In Step S103, the transmission controller 12 calculates an angular acceleration tmp2 by dividing the difference tmp1 by a unit time $\Delta t$.

In Step S104, the transmission controller 12 calculates an upper limiter $\Delta\omega H$ and a lower limiter $\Delta\omega L$ of the angular acceleration by a limiter setting control.

Figure 3:
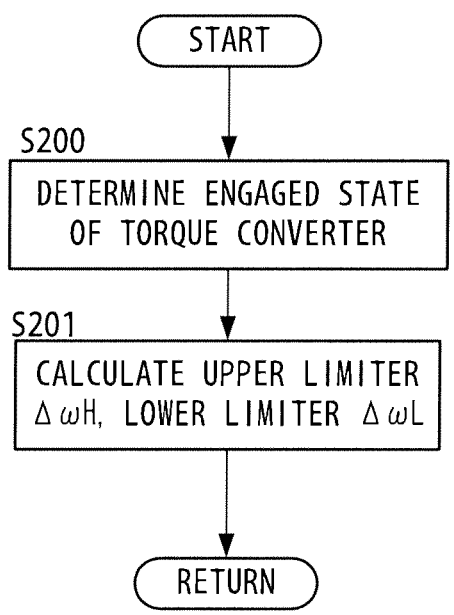
FIG. 3 is a flow chart showing a limiter setting control of this embodiment.

Here, the limiter setting control is described using a flow chart of FIG. 3.

In Step S200, the transmission controller 12 determines an engaged state of the torque converter 6.

Figure 4:
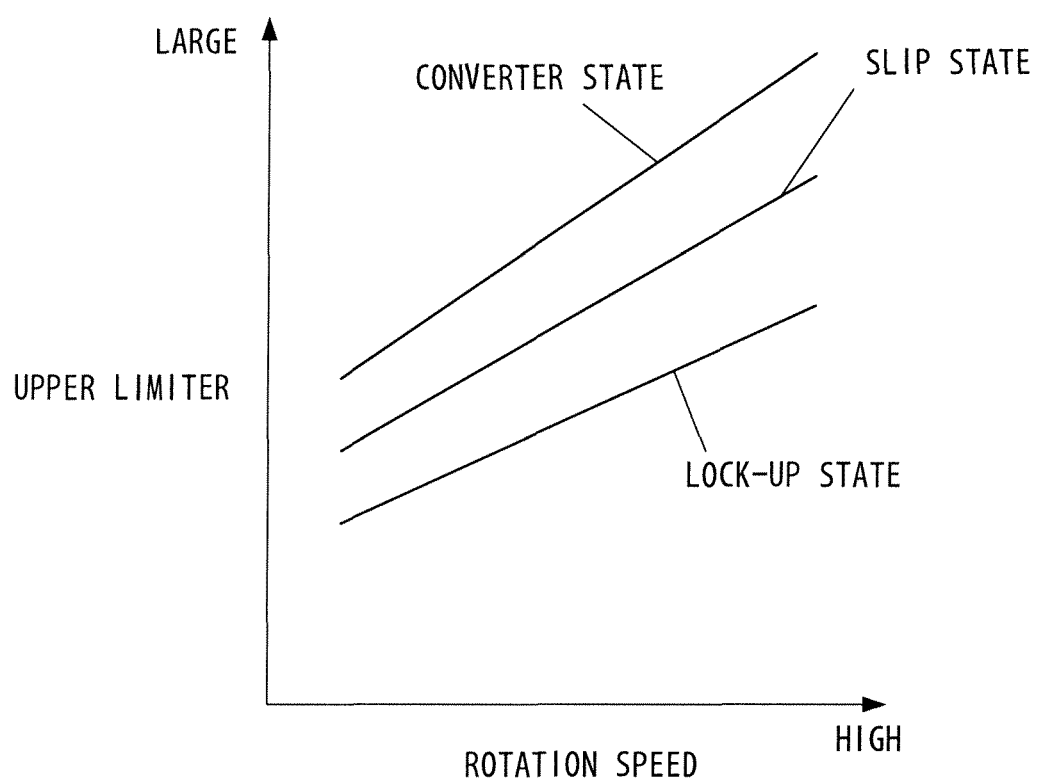
FIG. 4 is a graph showing a relationship among a primary pulley rotational speed, an engaged state of a torque converter and an upper limiter.
Figure 5:
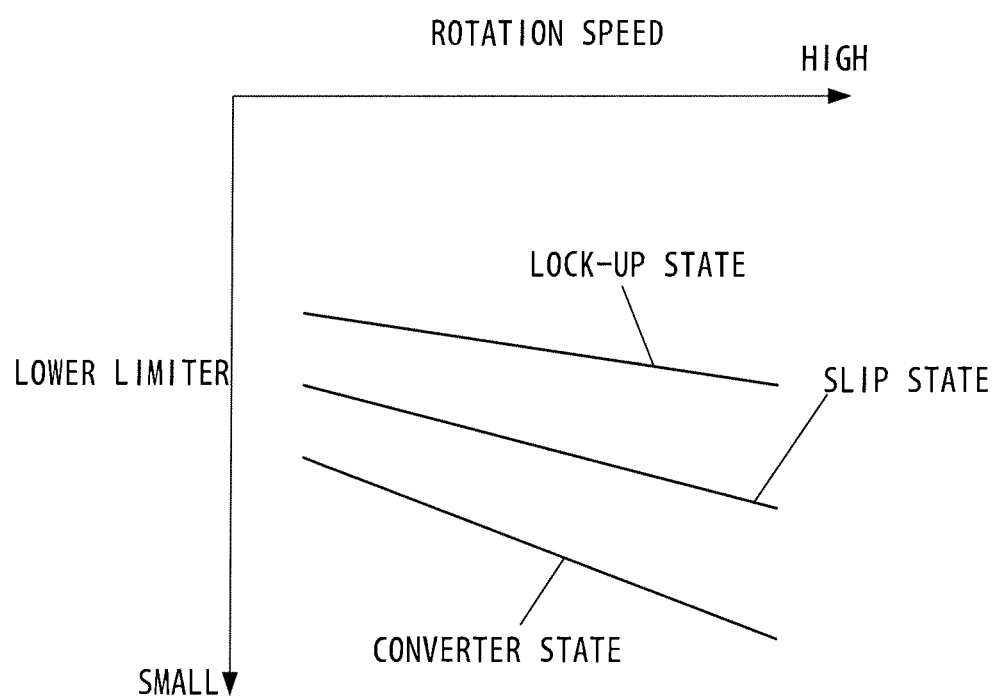
FIG. 5 is a graph showing a relationship among the primary pulley rotational speed, the engaged state of the torque converter and a lower limiter.

In Step S201, the transmission controller 12 calculates the upper limiter $\Delta\omega H$ from FIG. 4 and the lower limiter $\Delta\omega L$ from FIG. 5 using the primary pulley rotational speed Npri and the engaged state of the torque converter 6.

FIG. 4 is a graph showing a relationship among the primary pulley rotational speed Npri, the engaged state of the torque converter 6 and the upper limiter $\Delta\omega H$. The upper limiter $\Delta\omega H$ increases as the primary pulley rotational speed Npri increases and as the engaged state of the torque converter 6 changes from the lock-up state to the slip state to the converter state.

FIG. 5 is a graph showing a relationship among the primary pulley rotational speed Npri, the engaged state of the torque converter 6 and the lower limiter $\Delta\omega L$. The lower limiter $\Delta\omega L$ increases in a negative direction as the primary pulley rotational speed Npri increases and as the engaged state of the torque converter 6 changes from the lock-up state to the slip state to the converter state.

Referring back to FIG. 2, in Step S105, the transmission controller 12 compares the angular acceleration tmp2 and the lower limiter $\Delta\omega L$. If the angular acceleration tmp2 is not higher than the lower limiter $\Delta\omega L$, i.e. if the absolute value of the angular acceleration tmp2 is not smaller than that of the lower limiter $\Delta\omega L$, the transmission controller 12 proceeds to Step S106. On the other hand, if the angular acceleration tmp2 is higher than the lower limiter $\Delta\omega L$, i.e. if the absolute value of the angular acceleration tmp2 is smaller than that of the lower limiter $\Delta\omega L$, the transmission controller 12 proceeds to Step S107.

In Step S106, the transmission controller 12 sets the lower limiter $\Delta\omega L$ as a final angular acceleration $\Delta\omega$.

In Step S107, the transmission controller 12 compares the angular acceleration tmp2 and the upper limiter $\Delta\omega H$. If the angular acceleration tmp2 is not lower than the upper limiter $\Delta\omega H$, i.e. if the absolute value of the angular acceleration tmp2 is not smaller than that of the upper limiter $\Delta\omega H$, the transmission controller 12 proceeds to Step S108. On the other hand, if the angular acceleration tmp2 is lower than the upper limiter $\Delta\omega H$, i.e. if the absolute value of the angular acceleration tmp2 is smaller than that of the upper limiter $\Delta\omega H$, the transmission controller 12 proceeds to Step S109.

In Step S108, the transmission controller 12 sets the upper limiter $\Delta\omega H$ as the final angular acceleration $\Delta\omega$.

In Step S109, the transmission controller 12 sets the angular acceleration tmp2 as the final angular acceleration $\Delta\omega$.

In the above control, the angular acceleration tmp2 is more likely to be set as the final angular acceleration $\Delta\omega$ as the primary pulley rotational speed Npri increases. When the primary pulley rotational speed Npri decreases, the primary pulley rotation sensor 13 detects fewer pulses per unit time, whereby calculation accuracy of the primary pulley rotational speed Npri decreases. That is, as the primary pulley rotational speed Npri increases, calculation accuracy of the primary pulley rotational speed Npri increases and calculation accuracy of the angular acceleration tmp2 calculated in Step S103 also increases. Thus, in Step S201, as the primary pulley rotational speed Npri increases, the absolute values of the upper limiter $\Delta\omega H$ and the lower limiter $\Delta\omega L$ increase. As a result, as the primary pulley rotational speed Npri increases, the angular acceleration tmp2 is more likely to be set as the final angular acceleration $\Delta\omega$.

Further, as the engaged state of the torque converter 6 changes to the converter state, the absolute values of the upper limiter $\Delta\omega H$ and the lower limiter $\Delta\omega L$ increase and the angular acceleration tpm2 is more likely to be set as the final angular acceleration $\Delta\omega$. As the engaged state of the torque converter 6 changes from the lockup state to the slip state to the converter state, the torque converter 6 can absorb influences caused by disturbance and the like and calculation accuracy of the angular acceleration tmp2 increases. Thus, as the engaged state of the torque converter changes to the converter state, the angular acceleration tmp2 is more likely to be set as the final angular acceleration $\Delta\omega$.

Figure 6:
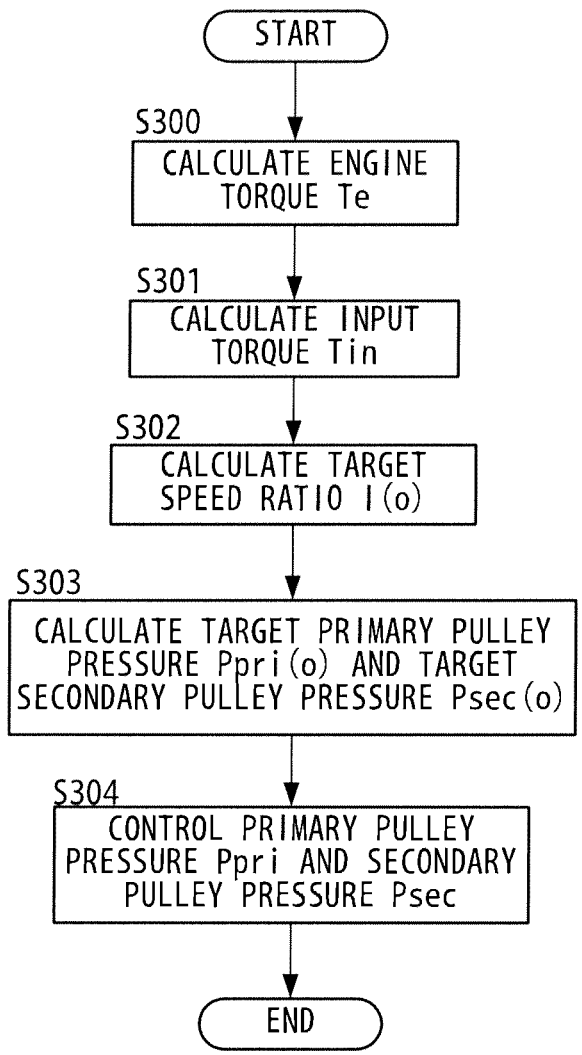
FIG. 6 is a flow chart showing a method for controlling a primary pulley pressure and a secondary pulley pressure.

Next, a method for controlling the primary pulley pressure Ppri and the secondary pulley pressure Psec using the final angular acceleration $\Delta\omega$ set using FIG. 2 is described using a flow chart of FIG. 6.

In Step S300, the transmission controller 12 calculates an engine torque Te from the accelerator pedal opening APO and the engine rotational speed.

In Step S301, the transmission controller 12 calculates an input torque Tin to be input to the variator 1 using the engine torque Te and the final angular acceleration $\Delta\omega$ by Equation (3).

$$T_{in} = Te - I \times \Delta\omega \tag{3}$$

In Equation (3), "I" denotes a moment of inertia in the torque converter 6 and the forward/reverse switching mechanism 7. The moment of inertia "I" increases as the engaged state of the torque converter 6 changes from the converter state to the slip state to the lock-up state. This is because the engine 5 becomes a load when viewed from the primary pulley 2 and the load increases as the engaged state of the torque converter 6 changes to the lock-up state. Further, the moment of inertia "I" increases as the number of rotational elements of the forward/reverse switching mechanism 7 increases.

In Step S302, the transmission controller 12 calculates the target speed ratio I(o). The transmission controller 12 calculates a target input rotational speed based on a shift map set in advance using a vehicle speed TVO obtained from the secondary pulley rotational speed Nsec and the accelerator pedal opening APO, and calculates a theoretical speed ratio Ip corresponding to a driving condition (vehicle TVO and accelerator pedal opening APO) by dividing the target input rotational speed by the secondary pulley rotational speed Nsec.

Subsequently, after an actual speed ratio ip is calculated by dividing the primary pulley rotational speed Npri by the secondary pulley rotational speed Nsec and a deviation between the theoretical speed ratio Ip and the actual speed ratio ip is calculated, the target speed ratio I(o) is calculated by multiplying a disturbance-compensated theoretical speed ratio Ip by a first-order lag filter $\{1/(Tm \cdot s+1))\}$ taking a response delay by hardware into consideration.

In Step S303, the transmission controller 12 calculates a target primary pulley pressure Ppri(o) and a target secondary pulley pressure Psec(o) based on the input torque Tin and the target speed ratio I(o).

In Step S304, the transmission controller 12 controls the primary pulley pressure Ppri and the secondary pulley pressure Psec by supplying or discharging oil to or from the primary pulley chamber 2c and the secondary pulley chamber 3c based on the target primary pulley pressure Ppri(o) and the target secondary pulley pressure Psec(o).

By the above control, the primary pulley pressure Ppri and the secondary pulley pressure Psec are controlled to realize a shift.

Effects of the embodiment of the present invention are described.

The upper limiter $\Delta\omega H$ and the lower limiter $\Delta\omega L$ are so calculated that the absolute values thereof increase as the engaged state of the torque converter 6 changes from the lock-up state to the slip state to the converter state. Then, the smaller one of the absolute value of the angular acceleration tmp2 and that of the upper limiter $\Delta\omega H$ or the lower limiter $\Delta\omega L$ is set as the final angular acceleration $\Delta\omega$.

When the torque converter 6 is in the slip state or the converter state, influences caused by disturbance and the like can be absorbed by the torque converter 6. Thus, accuracy of the angular acceleration tmp2 calculated based on the primary pulley rotational speed Npri detected by the primary pulley rotation sensor 13 is high. In this case, by setting the angular acceleration tmp2 as the final angular acceleration $\Delta\omega$, it is possible to accurately control the primary pulley pressure Ppri and the secondary pulley pressure Psec, improve fuel economy and suppress belt slippage.

Further, when the torque converter 6 is in the lock-up state, influences caused by disturbance and the like reach the primary pulley rotation sensor 13 and accuracy of the angular acceleration tmp2 calculated based on the primary pulley rotational speed Npri detected by the primary pulley rotation sensor 13 is low. In this case, by setting the upper limiter $\Delta\omega H$ or the lower limiter $\Delta\omega L$ as the final angular acceleration $\Delta\omega$, it is possible to accurately control the primary pulley pressure Ppri and the secondary pulley pressure Psec by suppressing influences caused by disturbance and the like, improve fuel economy and suppress belt slippage.

If the primary pulley pressure and the secondary pulley pressure are controlled based on a change in the engine torque without using this embodiment, the primary pulley pressure and the secondary pulley pressure may be increased or decreased by an inertia torque in the torque converter and the like although a torque variation caused by a change in engine torque does not occur in the variator. Thus, fuel economy may be deteriorated by excessive hydraulic pressure supply relative to a necessary pressure or belt slippage may occur due to insufficient hydraulic pressure supply.

On the contrary, in this embodiment, the primary pulley pressure Ppri and the secondary pulley pressure Psec can be accurately controlled without being affected by an inertia torque and the like in the torque converter 6 and the like by controlling the primary pulley pressure Ppri and the secondary pulley pressure Psec based on the input torque Tin to the variator 1. Thus, it is possible to improve fuel economy and suppress the occurrence of belt slippage. Further, since the angular acceleration $\Delta\omega$ can be accurately calculated, the input torque Tin to be input to the variator 1 can be accurately calculated and the primary pulley pressure Ppri and the secondary pulley pressure Psec can be accurately controlled. Thus, it is possible to improve fuel economy and suppress the occurrence of belt slippage.

By increasing the absolute values of the upper limiter $\Delta\omega H$ and the lower limiter $\Delta\omega L$ as the primary pulley rotational speed Npri increases, the angular acceleration tmp2 is set as the final angular acceleration $\Delta\omega$ if calculation accuracy of the primary pulley rotational speed Npri is high. In this way, it is possible to improve accuracy of the final angular acceleration $\Delta\omega$, improve fuel economy and suppress the occurrence of belt slippage.

The present invention is not limited to the above embodiment and it goes without saying that various changes and improvements that can be made within the scope of the technical concept of the present invention are included.

Although the lower limiter $\Delta\omega L$ is set and the angular acceleration is limited also when the angular acceleration tmp2 has a negative value in the above embodiment, the angular acceleration tmp2 may be set as the final angular acceleration $\Delta\omega$ without setting the lower limit $\Delta\omega L$ if the angular acceleration tmp2 has a negative value. This prevents the lower limiter $\Delta\omega L$ from being set as the final angular acceleration $\Delta\omega L$ if the angular acceleration tmp2 decreases in a negative direction, i.e. if a torque transmitted to the variator 1 decreases. Thus, there is no likelihood that the primary pulley pressure Ppri or the secondary pulley pressure Psec is controlled to a hydraulic pressure lower than a hydraulic pressure necessary to prevent belt slippage in the variator 1. Therefore, it can be suppressed that belt slippage occurs at the primary pulley or the secondary pulley due to insufficient hydraulic pressure.

Further, although the angular acceleration tmp2 is calculated based on the primary pulley rotation sensor 13 in this embodiment, the angular acceleration may be calculated using, for example, a turbine rotation sensor and a vehicle speed sensor arranged closer to the drive wheels 17 than the torque converter 6 without being limited to this.

Further, although the belt 4 is described as a power transmission member wound around the primary pulley 2 and the secondary pulley 3 in this embodiment, the power transmission member may be a chain formed by coupling a plurality of links by pins without being limited to this.

Furthermore, although the engine 5 is used as a drive source, a motor may be used.

This application claims priority from Japanese Patent Application No. 2011-63899, filed Mar. 23, 2011, which is incorporated herein by reference in its entirety.

What is claimed is:

1. A controller for controlling a continuously variable transmission including a variator with a primary pulley at an input side for changing a groove width by a hydraulic pressure, a secondary pulley at an output side for changing a groove width by a hydraulic pressure and a power transmission member mounted between the primary pulley and the secondary pulley, and a torque converter arranged between a drive source and the variator, comprising:
   a rotational speed detecting unit configured to detect the rotational speed of a rotor located closer to drive wheels than the torque converter;
   a rotational speed change amount calculating unit configured to calculate a change amount in the rotational speed per unit time;
   a limit setting unit configured to set a higher absolute value of a limiter for the change amount as a rotational speed difference between an input shaft and an output shaft of the torque converter increases;
   a final change amount setting unit configured to set the smaller one of the absolute value of the change amount and that of the limiter as a final change amount; and
   a hydraulic control unit configured to control a hydraulic pressure to be supplied to the variator based on the final change amount.

2. The controller according to claim 1 further comprising an input torque calculating unit configured to calculate an input torque to be input to the variator based on the final change amount, wherein:
the hydraulic control unit is configured to control the hydraulic pressure to be supplied to the variator based on the input torque.

3. The controller according to claim 1, wherein:
the rotational speed detecting unit is configured to detect the rotational speed based on a pulse signal given by the rotation of the rotor; and
the limit setting unit is configured to increase the absolute value of the limiter as the rotational speed of the rotor increases.

4. The controller according to claim 1, wherein the final change amount setting unit is configured to set the change amount as the final change amount if the change amount is negative.

5. A control method for controlling a continuously variable transmission including a variator with a primary pulley at an input side for changing a groove width by a hydraulic pressure, a secondary pulley at an output side for changing a groove width by a hydraulic pressure and a power transmission member mounted between the primary pulley and the secondary pulley, and a torque converter arranged between a drive source and the variator, comprising:
detecting by a controller, the rotational speed of a rotor located closer to drive wheels than the torque converter;
calculating by the controller, a change amount in the rotational speed per unit time;
setting by the controller, a higher absolute value of a limiter for the change amount as a rotational speed difference between an input shaft and an output shaft of the torque converter increases;
setting by the controller, the smaller one of the absolute value of the change amount and that of the limiter as a final change amount; and
controlling by the controller, a hydraulic pressure to be supplied to the variator based on the final change amount.

6. The control method according to claim 5, further comprising calculating by the controller, an input torque to be input to the variator based on the final change amount, wherein:
the hydraulic pressure to be supplied to the variator is controlled by the controller based on the input torque.

7. The control method according to claim 5, wherein:
the rotational speed is detected by the controller based on a pulse signal given by the rotation of the rotor; and
the absolute value of the limiter is increased by the controller as the rotational speed of the rotor increases.

8. The control method according to claim 5, wherein the change amount is set by the controller as the final change amount if the change amount is negative.

9. A controller for controlling a continuously variable transmission including a variator with a primary pulley at an input side for changing a groove width by a hydraulic pressure, a secondary pulley at an output side for changing a groove width by a hydraulic pressure and a power transmission member mounted between the primary pulley and the secondary pulley, and a torque converter arranged between a drive source and the variator, comprising:
rotational speed detecting means for detecting the rotational speed of a rotor located closer to drive wheels than the torque converter;
rotational speed change amount calculating means for calculating a change amount in the rotational speed per unit time;
limit setting means for setting a higher absolute value of a limiter for the change amount as a rotational speed difference between an input shaft and an output shaft of the torque converter increases;
final change amount setting means for setting the smaller one of the absolute value of the change amount and that of the limiter as a final change amount; and
hydraulic control means for controlling a hydraulic pressure to be supplied to the variator based on the final change amount.

10. The controller according to claim 9, further comprising input torque calculating means for calculating an input torque to be input to the variator based on the final change amount, wherein:
the hydraulic control means controls the hydraulic pressure to be supplied to the variator based on the input torque.

11. The controller according to claim 9, wherein:
the rotational speed detecting means detects the rotational speed based on a pulse signal given by the rotation of the rotor; and
the limit setting means increases the absolute value of the limiter as the rotational speed of the rotor increases.

12. The controller according to claim 9, wherein the final change amount setting means sets the change amount as the final change amount if the change amount is negative.

* * * * *